United States Patent [19]

Date et al.

[11] 3,882,831

[45] May 13, 1975

[54] INTAKE CONTROL FOR INTERNAL COMBUSTION ENGINES

[75] Inventors: Tasuku Date, Tokyo; Shizuo Yagi; Kiyoshi Miyaki, both of Asaka, all of Japan

[73] Assignee: Honda Giken Kogyo Kabushiki Kaisha, Tokyo, Japan

[22] Filed: Mar. 15, 1974

[21] Appl. No.: 451,584

[30] Foreign Application Priority Data
Mar. 19, 1973 Japan.............................. 48-30862

[52] U.S. Cl......... 123/75 B; 123/32 ST; 123/32 SP; 123/127
[51] Int. Cl............................................ F02b 75/02
[58] Field of Search.... 123/127, 75 B, 32 ST, 32 SP

[56] References Cited
UNITED STATES PATENTS

| | | | |
|---|---|---|---|
| 2,930,368 | 3/1960 | Mick.................................. | 123/127 |
| 3,186,691 | 6/1965 | Manning............................ | 123/127 |
| 3,512,510 | 5/1970 | Manning............................ | 123/127 |
| 3,756,209 | 9/1973 | Hida.................................. | 123/127 |
| 3,794,004 | 2/1974 | Stoltman........................... | 123/127 |
| 3,830,206 | 8/1974 | Asaka................................ | 123/127 |
| 3,832,984 | 9/1974 | Taguchi............................. | 123/75 B |

Primary Examiner—Manuel A. Antonakas
Assistant Examiner—Daniel J. O'Connor
Attorney, Agent, or Firm—Lyon & Lyon

[57] ABSTRACT

An intake control device for internal combustion engines of the type including a main combustion chamber and an auxiliary combustion chamber, the latter having a spark plug, the chambers being jointed by a torch passage, the chambers being connected respectively to a main intake passage and an auxiliary intake passage having corresponding intake valves; the intake control device including a main carburetor having a main primary passageway and a main secondary passageway communicating with the main combustion chamber through the main intake manifold passage, and an auxiliary carburetor having an auxiliary passageway communicating with the auxiliary combustion chamber through the auxiliary intake manifold passage; the intake control device further including a main primary, a main secondary and an auxiliary throttle valves mounted respectively in the primary, secondary and auxiliary passageways, and cams and levers interconnecting each throttle valve and partially actuated by a vacuum pressure operated assembly to maintain optimum quantity of air-fuel mixtures in the main and auxiliary combustion chambers throughout light and heavy engine load conditions.

3 Claims, 1 Drawing Figure

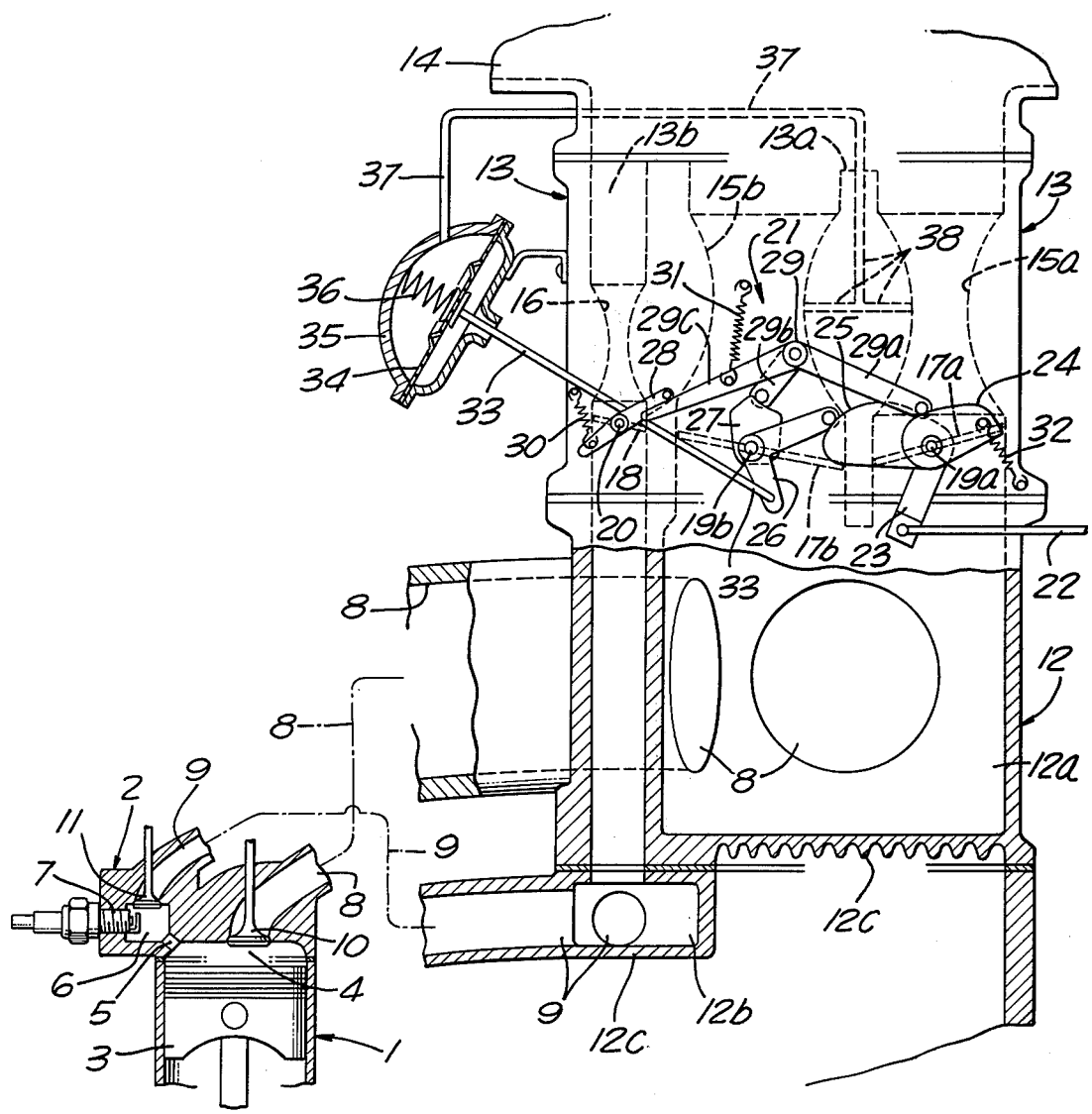

3,882,831

INTAKE CONTROL FOR INTERNAL COMBUSTION ENGINES

SUMMARY OF THE INVENTION

A primary object of the present invention is to provide an intake control device for internal combustion engines of the type including a main combustion chamber and an auxiliary combustion chamber, the latter having a spark plug, the chambers being joined by a torch passage, the chambers also being connected respectively to a main intake passage and an auxiliary intake passage having corresponding intake valves; the intake control device including a carburetor structure having three passageways, namely, a main primary passageway and a main secondary passageway connected to the main intake passage and an auxiliary passgeway connected to the auxiliary intake passage, and a novel lever and cam means interconnecting the throttle valves to assure delivery of optimum air-fuel mixtures to the main and auxiliary combustion chambers throughout the operating range of the engine.

A further object is to provide an intake control device as indicated in the previous object wherein, under light load engine operating range, the main primary throttle valve and auxiliary throttle valve operate in unison while the main secondary valve remains closed thereby to produce the optimum quantity of air-fuel mixtures in the main and auxiliary combustion chambers.

A further object is to provide an intake control device as indicated in the previous objects, wherein, as the engine load is increased into the heavy load operating range, the main secondary throttle valve is opened under influence of a vacuum pressure operated assembly functioning in conjunction with the lever and cam means whereby optimum quantity of air-fuel mixtures are maintained in the main and auxiliary combustion chambers.

DESCRIPTION OF THE DRAWINGS

The single FIGURE of the drawing illustrates fragmentarily and essentially diagrammatically an internal combustion engine and also the intake control mechanism on a larger scale, the engine and intake control mechanism being interconnected by broken lines.

Referring to the drawing, an internal combustion engine adapted for use with the intake control device includes an engine block 1 having one or more cylinders capped by an engine head 2. Each cylinder is provided with a piston 3, and the head 2 forms with the cylinder and piston, a main combustion chamber 4 connected through a torch passage 5 to an auxiliary combustion chamber 6 provided in the engine head 2. Each auxiliary combustion chamber is provided with a spark plug 7.

The engine head 2 is provided with a main intake passage 8 and an auxiliary intake passage 9 for each main and auxiliary combustion chamber 4 and 6, and are provided respectively with main and auxiliary intake valves 10 and 11. The intake vlaves are provided with suitable operating means, not shown; and each main combustion chamber is provided with an exhaust valve and exhaust passage, also not shown.

The intake control device includes an intake chamber 12 provided with a main intake chamber 12a having an outlet connected to each main intake passage 8 and an auxiliary intake chamber 12b connected to each auxiliary intake passage 9. A wall 12c of the intake chamber 12 forms part of a heating chamber through which passage heated exhaust gases to promote vaporization of air-fuel mixtures in the chambers 12a and 12b.

Mounted above the intake chamber 12 is a carburetor structure 13 having an inlet end connected to an air cleaner 14. The inlet end is provided with a main inlet 13a which communicates with the main intake chamber 12a through a main primary passageway 15a having a main primary venturi throat and a main secondary passageway 15b having a main secondary venturi throat. The inlet end of the carburetor structure is also provided with an auxiliary inlet 13b which communicates with the auxiliary intake chamber 12b through an auxiliary passageway 16 having an auxiliary venturi throat.

The passageways 15a, 15b and 16 are provided respectively with a main primary throttle valve 17a, a main secondary throttle valve 17b, and an auxiliary throttle valve 18 mounted on shafts 19a, 19b and 20 respectively. The shafts and their throttle valves are interconnected by an actuating mechanism indicated generally by 21.

The actuating mechanism includes a throttle control wire or rod 22 connected to accelerator pedal, not shown, and is attached to a lever 23 secured to the main primary throttle valve shaft 19a. Also mounted on the shaft 19a is a cam 24 which controls movement of the auxiliary throttle valve 18 and a cam 25 which controls the main secondary throttle valve 17b. Mounted on the shaft 19b is a bell crank lever 26 and a cam 27. Mounted on the shaft 20 is a two arm lever 28.

Pivotally mounted externally on the carburetor structure 13 above the previously mentioned cams and levers is a three arm lever 29 having a first arm 29a engaging the cam 24, a second arm 29b engaging the cam 27, and a third arm 29c engaging one arm of the two arm lever 28. The cam surface of the cam 27 is profiled to counter the arc of the second arm 29b of three arm lever 29 at the closed position of main secondary throttle valve 17b and the free end of the second arm 29b is so designed to maintain the coordinating movement with the cam surface at any turning movement of the second arm 29b.

The second arm of the lever 28 is attached to a spring 30 urging the auxiliary throttle valve 18 toward an open position. This is counteracted by a spring 31 attached to the third arm 29c of the lever 29 which bears against the first arm of lever 28. Closing torque of the auxiliary throttle valve 18 by the spring 31 is designed to be stronger than the opening torque by the spring 30. A spring 32 attached to cam 24 urges the main primary throttle valve 17a toward its closed position in opposition to the accelerator rod 22.

The second of depending arm of the bell crank lever 26 is connected by a rod 33 to a diaphragm 34 mounted within a housing 35 of a vacuum pressure operated assembly and opposed by a spring 36. The housing chamber containing the spring 36 is subjected to vacuum pressure by means of a tube 37 and passageways 38 in the carburetor structure 13 which communicate with both the main primary and the main secondary passageways 15a and 15b at their constructed regions.

The main primary and secondary passageways 15a and 15b are provided with nozzles, not shown, for introducing fuel to produce lean air-fuel mixtures; while the auxiliary passageway 16 is provided with nozzle, not shown, for introducing fuel to produce a rich air-fuel mixture.

Operation of the type of internal combustion engine illustrated is as follows:

A lean air-fuel mixture is drawn into the main combustion chamber 4 during each intake stroke. Simultaneously a rich air-fuel mixture is drawn into the auxiliary combustion chamber 6. During a time for immediately before to after piston top dead center, the rich mixture in the auxiliary combustion chamber is ignited by the spark plug 7 producing a torch flame which rapidly ejects through the torch passage 5 into the main combustion chamber to progressively burn the lean mixture present therein.

The intake control device maintains an optimum quantity of air-fuel mixture for the main and auxiliary combustion chambers throughout the operating range of the engine and operates as follows:

The drawing illustrates the intake control device in its condition wherein the throttle valves 17a, 17b and 18 are closed.

When the accelerator pedal is initially depressed, pulling the rod 22, the lever 23 moves the main primary throttle valve 17a counter-clockwise from its closed position and also turns the cam 24 counter-clockwise raising the arm 29a of the lever 29, turning this lever also counter-clockwise. This movement moves the arm 29c away from the lever 28, permitting the lever 28 to turn clockwise following the arm 29c due to the action of the spring 30. This movement of the lever 28 opens the auxiliary throttle valve 18 in proportion to the opening movement of the main primary throttle valve 17a.

Under light engine load conditions; that is, within a predetermined initial range of movement of the throttle valves 17a and 18, the cam 25 turns counter-clockwisely together with the main primary throttle valve 17a to become free from the bell crank lever 26 and the second arm 29b of the three arm lever 29 follows the cam surface of the cam 27 without imposing any moving force on the cam 27. Therefore main secondary throttle vaive 17b is kept closed by the spring 36. Consequently, the lean and rich air-fuel mixtures delivered to the main and auxiliary combustion chambers is determined solely by the settings of the throttle valves 17a and 18. The shape of the cam 24 and dimensions of the levers 28 and 29 are so proportioned that optimum quantity of lean air-fuel and rich air-fuel mixtures are delivered to the main and auxiliary combution chambers under light engine load conditions.

As the load merges into a heavy engine load condition by further opening of the throttle valves 17a and 18, clearance between the cam 25 and lever 26 permits movement of the cam 27 and bell crank lever 26 in a clockwise direction to open the main secondary throttle valve 17b. The extent of this opening movement is limited by the cam 25, the position of which corresponds to the position of the throttle valve 17a. As the throttle valves 17a and 18 are opened further, the air velocity in the venturi throats increases and the pressure therein is correspondingly reduced so that a vacuum pressure is supplied to the housing 35 through the passageways 38 and tube 37. This vacuum pressuure acts on the diaphragm 34 to pull on the rod 33 causing the bell crank lever 26 to turn clockwise and open the main secondary throttle valve 17b to the extent permitted by the cam 25 and the cam 27 turns the second arm 29b clockwisely in the extent permitted by the cam 25.

Further movement of the throttle valve 17a under heavy load condition continues to turn the lever 29 counterclockwise permitting further clockwise movement of lever 28 and corresponding further opening of the auxiliary throttle vlave 18.

By proportioning the cams and lever arms partially actuated by the diaphragm 34, optimum proportions of the lean air-fuel mixture and rich air-fuel mixture are maintained throughout the range of heavy engine load conditions. As a result the most efficient utilization of the fuel is maintained throughout the full range of operation of the engine.

Having fully described our invention, it is to be understood that we are not to be limited to the details herein set forth, but that our invention is of the full scope of the appended claims.

We claim:

1. An intake control device for internal combustion engines of the type including a main combustion chamber and an auxiliary combustion chamber, the latter having a spark plug, the chambers being joined by a torch passage and being connected respectively to an inlet valve controlled main intake passage and auxiliary intake passage, said intake control device comprising: a main carburetor including a main primary passageway having a first throttle valve and a main secondary passageway having a second throttle valve, said primary and secondary passageways adapted to produce a lean air-fuel mixture and connected in common to said main intake passage, an auxiliary carburetor including an auxiliary passageway having a third throttle valve, said auxiliary passageway adapted to produce a rich air-fuel mixture and connected to said auxiliary intake passage; and interconnecting means operable under light engine load conditions to coordinatively open the first and third throttle valves, and operable to open said second throttle valve under a range of heavy engine load conditions continuing from the range of light engine load conditions, whereby the third throttle valve opens coordinatively with the turning movement of the second throttle valve.

2. An intake control device as defined in claim 1, wherein the interconnecting means further comprises: said main primary and secondary passageways having a main primary and a main secondary venturi throats, respectively; means for actuating the first throttle valve; cam and lever means operatively connecting the first and third throttle valves to effect proportional flow of air-fuel mixtures to said main and auxiliary intake passages; further cam and lever means operatively connecting the first and third throttle valves with the second throttle valve when the position of the first throttle valve exceeds a preselected setting; and means responsive to vacuum pressures in at least one of the main venturi throats for controlling the position of the second throttle valve.

3. An intake control device as defined in claim 1, wherein the interconnecting means further comprises: an accelerator pedal operated means for controlling the position of the first throttle valve; first and second cams rotatable with the first throttle valve; a third cam and lever engaging the second cam for operating the third throttle valve; a lever for operating the second throttle valve; a linking lever interconnecting the first cam, third cam and second throttle valve operating lever; and a vacuum responsive means also connected to the second throttle valve operating lever.

\* \* \* \* \*

UNITED STATES PATENT OFFICE
CERTIFICATE OF CORRECTION

PATENT NO. : 3,882,831
DATED : May 13, 1975
INVENTOR(S) : Tasuku Date; Shizuo Yagi; Kiyoshi Miyaki It is certified that error appears in the above-identified patent and that said Letters Patent are hereby corrected as shown below:

On first page, fourth line of ABSTRACT, "jointed" should read --joined--.

Col. 1, line 17, "passgeway" should read --passageway--.

Col. 1, line 61, "vlaves" should read --valves--.

Col. 2, line 4, "passage" should read --passes--.

Col. 3, line 10, "time for" should read --time from--.

Signed and Sealed this nineteenth Day of August 1975

[SEAL]

Attest:

RUTH C. MASON
Attesting Officer

C. MARSHALL DANN
Commissioner of Patents and Trademarks